United States Patent
Winer et al.

(10) Patent No.: US 10,721,420 B2
(45) Date of Patent: Jul. 21, 2020

(54) METHOD AND SYSTEM OF ADAPTABLE EXPOSURE CONTROL AND LIGHT PROJECTION FOR CAMERAS

(71) Applicant: INTEL CORPORATION, Santa Clara, CA (US)

(72) Inventors: Paul Winer, Santa Clara, CA (US); Richmond Hicks, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 696 days.

(21) Appl. No.: 14/849,561

(22) Filed: Sep. 9, 2015

(65) Prior Publication Data

US 2016/0360074 A1 Dec. 8, 2016

Related U.S. Application Data

(60) Provisional application No. 62/170,126, filed on Jun. 2, 2015.

(51) Int. Cl.
| | | |
|---|---|---|
| *H04N 5/33* | (2006.01) |
| *H04N 5/235* | (2006.01) |
| *H04N 5/225* | (2006.01) |
| *H04N 13/254* | (2018.01) |
| *G06T 7/521* | (2017.01) |

(Continued)

(52) U.S. Cl.
CPC .............. *H04N 5/33* (2013.01); *G06T 7/521* (2017.01); *H04N 5/2256* (2013.01); *H04N 5/2353* (2013.01); *H04N 13/254* (2018.05); *H04N 13/271* (2018.05); *G01B 11/25* (2013.01);

(Continued)

(58) Field of Classification Search
CPC ...... G01S 17/89; G01S 17/107; G01S 17/936; G01S 7/4814; G01S 17/42; G01S 17/102; G01S 7/4802; G01S 7/487; G01S 17/023; G01S 17/48; G01S 7/4863; G01S 7/4865; G01S 7/486; G01S 7/4868; G01S 17/88; G01S 7/023; G01S 7/481; G01S 7/4816; G01S 7/483; G01S 7/484; G01S 7/51; G01S 17/06; G01S 17/08; G01S 17/10; G01S 17/895; G01S 19/14; G01S 7/4808; G01S 7/4815; G01S 11/12; G01S 13/931; G01S 17/105; G01S 17/32; G01S 17/325; G01S 17/46; G01S 17/87
See application file for complete search history.

(56) References Cited

U.S. PATENT DOCUMENTS

| | | | |
|---|---|---|---|
| 2005/0206748 A1 | 9/2005 | Kato | |
| 2012/0075534 A1* | 3/2012 | Katz | .................. H04N 9/3182 |
| | | | 348/602 |

(Continued)

FOREIGN PATENT DOCUMENTS

KR  10-2009-0117586 A  11/2009

OTHER PUBLICATIONS

"Safety of Laser Products", International Standard IEC 60825-1, Edition 1.2, Aug. 2001, 122 pages.

(Continued)

*Primary Examiner* — Dave Czekaj
*Assistant Examiner* — Samuel D Fereja
(74) *Attorney, Agent, or Firm* — Green, Howard & Mughal LLP.

(57) ABSTRACT

Techniques related to a method and system of adaptable exposure control and light projection for cameras are described herein.

21 Claims, 11 Drawing Sheets

(51) Int. Cl.
    *H04N 13/271*     (2018.01)
    *G01B 11/25*     (2006.01)
    *H04N 13/00*     (2018.01)

(52) U.S. Cl.
    CPC .............. *G06T 2207/10048* (2013.01); *H04N 2013/0081* (2013.01)

(56) References Cited

U.S. PATENT DOCUMENTS

| | | | |
|---|---|---|---|
| 2012/0187838 A1* | 7/2012 | Hanna | G06K 9/2027 315/76 |
| 2012/0194650 A1 | 8/2012 | Izadi et al. | |
| 2012/0249781 A1* | 10/2012 | Vollmerhausen | G01S 17/107 348/135 |
| 2013/0242058 A1 | 9/2013 | Bae et al. | |
| 2013/0286214 A1 | 10/2013 | Woo et al. | |
| 2015/0373322 A1* | 12/2015 | Goma | G03B 17/38 348/21 |

OTHER PUBLICATIONS

Weiner, Robert, "Changes in the New Edition to the IEC 60825-1 Laser Safety Standard", Paper 103, Weiner Associates, 544 23rd Street, Manhattan Beach CA, 90266, USA, 3 pages.
Schulmeister, Karl, The Upcoming New Editions of IEC 60825-1 and ANSI Z136.1—Examples on Impact for Classification and Exposure Limits, Paper #C102, Seibersdort Laboratories; Laser Safety Test House and Consulting, 2444 Seibersdorf, Austria, 8 pages.
"MPE Tables", 8 pages.
International Search Report and Written for PCT/US2016/030443, dated Aug. 8, 2016, 16 pages.

* cited by examiner

FIG. 1B

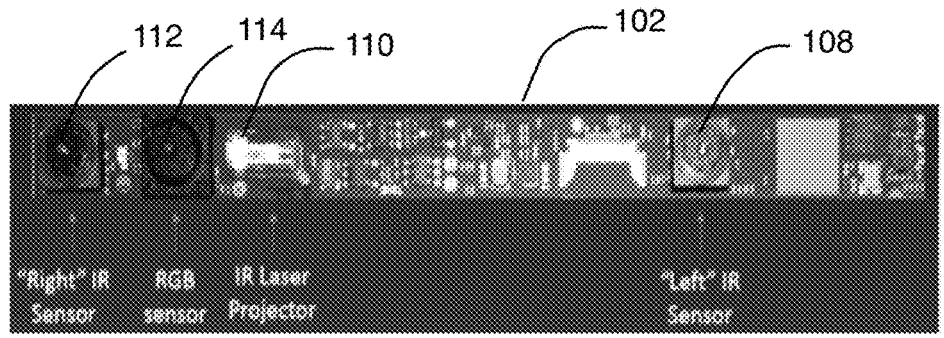

FIG. 2

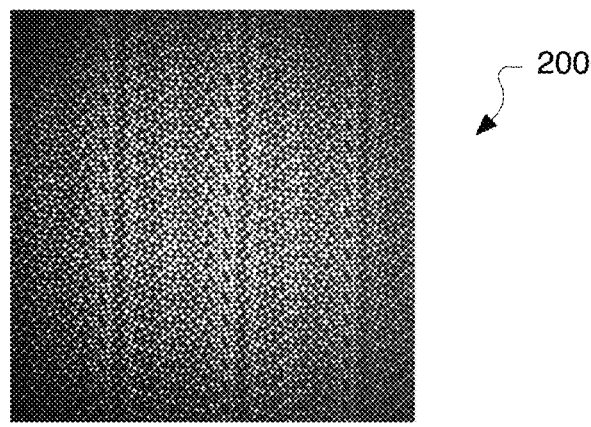

FIG. 3

PROJECT LIGHT IN MULTIPLE PULSES IN A SINGLE FRAME PERIOD, WHEREIN THE FRAME PERIOD IS USED TO CAPTURE A SINGLE IMAGE OF A SCENE 302

PERFORM MULTIPLE EXPOSURE TIMES DURING A SINGLE FRAME PERIOD AND AT AT LEAST ONE SENSOR USED TO DETECT THE SCENE 304

SYNCHRONIZE THE EXPOSURE TIMES TO THE PULSES SO THAT A SINGLE EXPOSURE TIME CORRESPONDS TO A SINGLE PULSE DURATION FOR MULTIPLE INDIVIDUAL PULSES DURING A SINGLE FRAME PERIOD 306

Conventional Exposure

Enhanced S/N with Conventional Exposure

Enhanced S/N with Adaptable Exposure

METHOD AND SYSTEM OF ADAPTABLE EXPOSURE CONTROL AND LIGHT PROJECTION FOR CAMERAS

CROSS-REFERENCE TO RELATED APPLICATION

This application claims the benefit of U.S. provisional patent application No. 62/170,126, filed Jun. 2, 2015, which is incorporated herein for all purposes.

BACKGROUND

Many electronic imaging devices, such as smartphones or tablets with one or more cameras actively illuminate the scene to facilitate extraction of non-traditional information from the scene. One example is depth measurement to objects in a scene, or measurement of the dimensions of an object in the scene, during image capture of the scene. One such system on these devices is an active stereoscopic system that can be used to generate images of objects in 3D space where each pixel is defined as having depth values in addition to the Red-Green-Blue (RGB) values typical in a 2D system. Active stereo systems illuminate the scene to provide detectable features to be used for depth measurement which enhances the cameras performance with respect to objects containing few naturally visible features for the stereo system to match and triangulate. Other examples of systems incorporating active illumination include structured light, which illuminates the scene with a specific pattern and uses that pattern to triangulate the individually recognized projected features; and coded light which projects a time varying pattern and analyzes distortions in the pattern to infer depth. Non-depth applications include iris scanning and face recognition, both of which use invisible illumination to reduce the effects of naturally occurring shadows.

In one specific example of active stereo depth cameras, two or more cameras may be used to measure depths of an object in a scene by using triangulation. This involves measuring the angles from a common object in the scene from two or more separate cameras or sensors. When the orientation and distance between the two or more cameras is known, the depth of the common object can be calculated.

The active stereo example resolves the case of there being insufficient object points in a scene to determine a triangulation, such as an image of a plain white wall. To accommodate these scenes, the active stereo camera includes a projector, such as an infra-red laser projector, to project an intensity pattern onto the scene. The stereo cameras, or IR sensors, may then use the intensity pattern to measure the depth of the object that the intensity pattern is projected upon. Difficulties often occur, however, when the scene is outside in sunlight. The sunlight can saturate the light entering the imaging device thereby resulting in a low signal-to-noise ratio (SNR), and this may even entirely wash out the projected intensity pattern.

In other examples, such as structured light or coded light, any external sources of illumination in the wavelength being used can interfere with the operation of the system including other systems employing similar technology. The sensor often cannot discriminate between light projected by the systems camera and light projected by a second camera, or other system using the same type of illumination. Therefore, light from a second system, or second camera on the same system, can distort the perceived scene and corrupt the depth measurement, or face recognition or iris recognition or any other application where the system requires control of the scene illumination for optimum performance.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1B is a another schematic diagram of an example imaging device with depth measurement and spatially varying intensity pattern projection in accordance with the implementations herein;

FIG. 2 is an example projected spatially varying intensity pattern used for the implementations herein;

FIG. 3 is a flow chart of a method of exposure control and pattern projection in accordance with the implementations herein;

DETAILED DESCRIPTION

Figure 1:
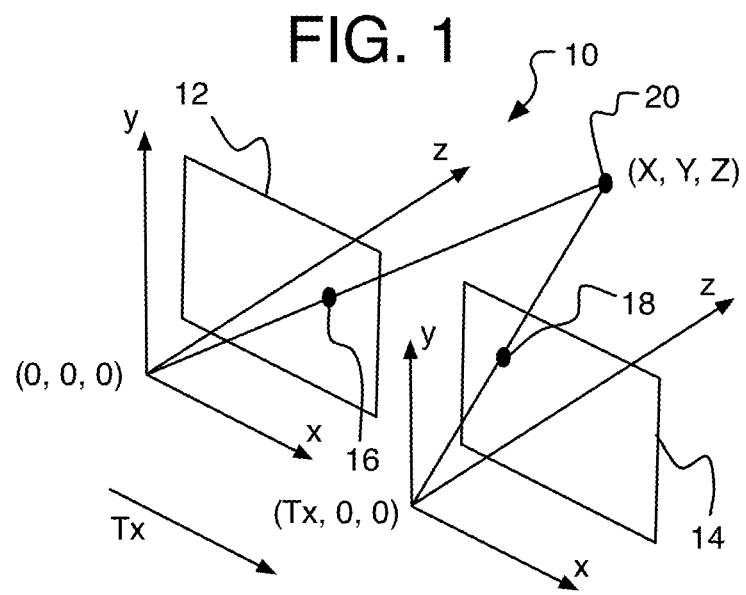
FIG. 1 is a schematic diagram to assist with explaining assisted stereoscopic depth measurement.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, camera arrays, smart phones, webcams, video game panels or consoles, set top boxes, tablets with multiple cameras, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods to provide adaptable exposure control and light projection for cameras is described below.

As mentioned above and while referring to FIG. 1, depth of an object in a scene being photographed or recorded may be determined with a 3D capable camera or imaging device with multiple cameras by determining the shift in image features as seen by two or more cameras separated by some distance (called the baseline) using assisted 3D stereoscopic depth cameras. Specifically, a stereo depth measurement system 10 is shown with two cameras or sensors on an xyz coordinate system, where the center of one sensor and origin of the optical axis is located at (0, 0, 0) and the center of another sensor and optical axis origin is at (Tx, 0, 0) where the two sensors are Tx apart from each and where Tx forms the baseline. Two left and right images 12 and 14 are respectively formed by the two cameras or sensors. An object, or key point of an object, 20 is at point (X, Y, Z). The 2D coordinates for the points 16 and 18 and of the object 20 on the left and right images 12 and 14 respectively can be calculated by triangulation. For purposes of illustration it can be shown that image coordinate points 16 and 18 of object 20 for the left sensor can be calculated as:

$$x_1 = f(X/Z) y_1 = f(Y/Z)$$

where $x_1$ and $y_1$ merely refer to the (x, y) coordinates of the left sensor (or left image). A similar calculation is performed for the right sensor. The function f( ) is based on the optical properties of the optical system and sensor arrangement. Since the cameras are on a non coincident baseline, features on the left and right sensors will be offset. This offset is referred to as disparity. By locating features with known feature matching algorithms on both sensors, the disparity can be determined. The disparity in turn can be used with known algorithms to determine the distance from the object or key points of the object. Such a depth measurement system that is dependent on the detection of features in a scene does not work well, however, on a featureless object or scene being photographed such as a blank wall where there are no key feature points that are detectable by a camera's sensors. One conventional solution to this is active illumination that includes projecting artificial features onto the scene instead. This may be accomplished by using either an LED or laser to project a light pattern onto the scene, typically in infra-red (IR) radiation and to provide feature points that can be detected by IR sensors to better ensure that depth can be calculated for an otherwise featureless object.

In the outdoors, however, sunlight dominates the light and can cause solar interference that causes a low signal-to-noise ratio, and can even wash out the projection. The sun emits light with a content that includes a strong 850 nm light, and most systems typically project their patterns at about the same wavelength. Projection of a pattern at 850 nm was used because it has been found to be a good compromise among sensor response, laser efficiency and eye safety, except in bright sunlight. Thus, the system often did not work well unless it was indoors or at night.

Thus, it is desirable to provide a very bright projector to better ensure the detectability of the pattern. Boosting the brightness of the projector also may extend the working range from the camera. This solution, however, requires an increase in power that might not meet eye safety standards or thermal limitations.

To avoid thermal problems, the exposure time and projection time could be reduced. For example, rather than having the shutter open for a full frame period, the shutter may be closed for a portion of the frame period for a set amount of time. This, however, remains limited by the maximum eye safety power for frame rates below approximately 200 KHz whereas current systems operate at a maximum frame rate of 60 Hz.

To resolve these issues then, the present method and system discloses a compromise solution that modulates the projection during at least a portion of the frame period and with a modulation frequency that meet the requirements to apply an average eye safety threshold rather than the peak threshold. This permits a boost in power that is less likely to be washed out by sunlight. The sunlight rejection can be further enhanced by switching the wavelength of the projector and sensor to 940 nm because the atmosphere absorbs relatively more energy at the desired wavelength of 940 nm resulting in less available sunlight at 940 nm at low altitudes. Also, the exposure time at the sensors is modulated so that the sensor collects light signals during a pulse and discards energy between the pulses. By synchronizing the exposure time to the pulses, sunlight rejection may be improved by 10 to 1000 times thereby substantially increasing the pattern detection efficiency. While the synchronization method at the new wavelength may be performed by a variety of different sensor and projector technologies, the use of a VCSEL laser projector coupled with sensors that have a quantum film is expected to provide a substantial improvement in efficient sunlight rejection as described below.

Figure 1A:
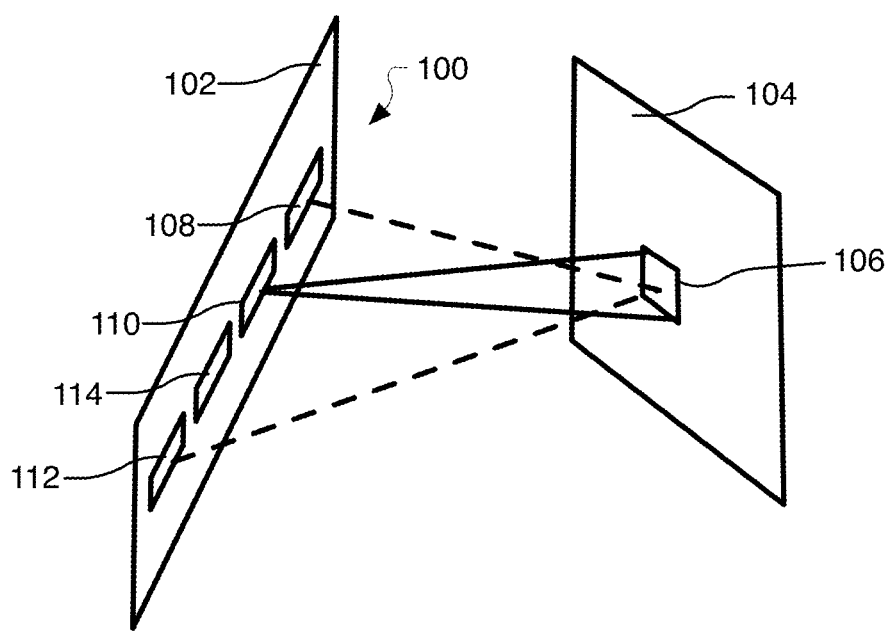
FIG. 1A is an example imaging device with depth measurement and spatially varying intensity pattern projection and shown in operation in accordance with the implementations herein.

Referring to FIG. 1A, an imaging device 100 is provided to measure the 3D or depth of an object 104 in a scene being photographed or recorded in a video recording. The object may be a featureless object such as a plain white wall with no clear distinct features that can be detected by conventional RGB detection techniques. Here, a projector 110 is provided, which may be an IR varying intensity pattern projector. The projector may be LED, laser, or VCSEL as described herein, and projects a pattern 106 on the object 104 as shown by the solid lines from projector 108 to pattern 106. Such a pattern may be similar to pattern 200 (FIG. 2), which is a projection of a varying light pattern at a target IR, or near IR (NIR), wavelength such as about 940 nm, or about 939 nm to about 941 nm. The projector is arranged to use higher power settings and to emit the wavelengths needed to avoid sunlight washout, and that are pulsed in configurations that avoid exceeding eye safety average thresholds for image frame periods as explained below.

The imaging device 100 also may have left and right IR sensors 108 and 112 that detect the pattern 106 by the dashed lines from the pattern 106 to the sensors 108 and 112. The pattern is sufficiently large so that detection of a feature by both sensors is considered to be the same point and is used for triangulation calculations to determine a depth distance from the imaging device 100 to the object 104. The sensors also each have an electronic shutter to control the light entering the sensors. The exposure can be controlled so that the exposure times are synchronized with the pulses of the projector in order to minimize sunlight rejection. An RGB sensor 114 also may be provided and used to determine the visual color and appearance of the object being measured. The details of the exposure and IR projection control are provided below.

Referring to FIG. 3, an example process 300 for adaptable exposure control and light projection for cameras described herein is arranged in accordance with at least some implementations of the present disclosure. In the illustrated implementation, process 300 may include one or more operations, functions or actions as illustrated by one or more of operations 302 and 306. By way of non-limiting example, process 300 will be described herein with reference to example image processing system of FIGS. 1A, 4, and 13 where relevant.

By one implementation of an image processing system, process 300 may include "PROJECT LIGHT IN MULTIPLE PULSES IN A SINGLE FRAME PERIOD, WHEREIN THE FRAME PERIOD IS USED TO CAPTURE A SINGLE IMAGE OF A SCENE" 302. As explained herein, such light may in the form of a pattern, such as a geometrical pattern by one example, that may be projected onto so called featureless objects that have few detectable points that may be recognized by a typical camera for depth measurement for example. Thus, the pattern projected onto an object provides the points that can be detected by a camera sensor. The pattern may be undetectable by the human eye such in the near infra-red zone (IR or NIR) which is about 700 nm to 1000 nm wavelengths. The wavelength for this method, however, is even more specific as explained below.

In one example, the pulses collectively have a total duration that forms a proportion of the total frame period. The total frame period includes the time the pulses are off before, after, and/or between the pulses. The proportion has a duration that results in an average power to generate the pulses over the frame period that is below a maximum eye safety threshold for the power of a single frame period. The pulses have a frequency greater than a certain threshold (such as greater than 200 kHz by one possible example) so that the eye safety threshold is computed as an average power over the frame period rather than a peak threshold, which enables a higher peak power in combination with a wavelength with relatively less energy in sunlight. By one form, the wavelength is set at about 940 nm, or in a range of about 939 nm to 941 nm. It also will be understood that the example eye safety threshold (200 kHz) may be very different depending on the laser configuration and type, aperture, peak power profile, divergent angles, and other factors. It also will be understood that the average power of a frame period may not be the only threshold that needs to be complied with for eye safety.

Process 300 also may include "PERFORM MULTIPLE EXPOSURE TIMES DURING THE SINGLE FRAME PERIOD AND AT AT LEAST ONE SENSOR USED TO DETECT THE SCENE" 304. Thus, the sensors are modulated shutter sensors that are able to perform multiple exposure times in a single frame period. As explained below, this may be used to limit sunlight rejection (or domination) of the desired light capture from the projected pattern. The exposure times may be set to provide an open shutter during one or more projections (or pulses) of the pattern.

By this alternative, process 300 also may include "SYNCHRONIZE THE EXPOSURE TIMES TO THE PULSES SO THAT A SINGLE EXPOSURE TIME CORRESPONDS TO A SINGLE PULSE DURATION FOR MULTIPLE INDIVIDUAL PULSES DURING A SINGLE FRAME PERIOD" 306, and particularly, so that the sensor exposure is started at or near the start of an individual pulse and ended at or near the end of an individual pulse for multiple pulses, and by one example, for each projector pulse during the frame period. The exposure time is limited to the pulse duration to further limit rejection of the desired light from the pattern by sunlight.

It also will be understood that any discussion of the pulses matching or corresponding to exposure times (or vice versa) or that both occur at the same time may refer to generally or substantially occurring at the same time depending on what is needed or desired to block a sufficient amount of sunlight. Thus, the exposure times may be slightly different (such as starting earlier and/or ending later) to ensure no pulse duration is undesirably cut off from inclusion by the shutter for example, and in units relative to the methods herein (such as measured in ns).

Figure 4:
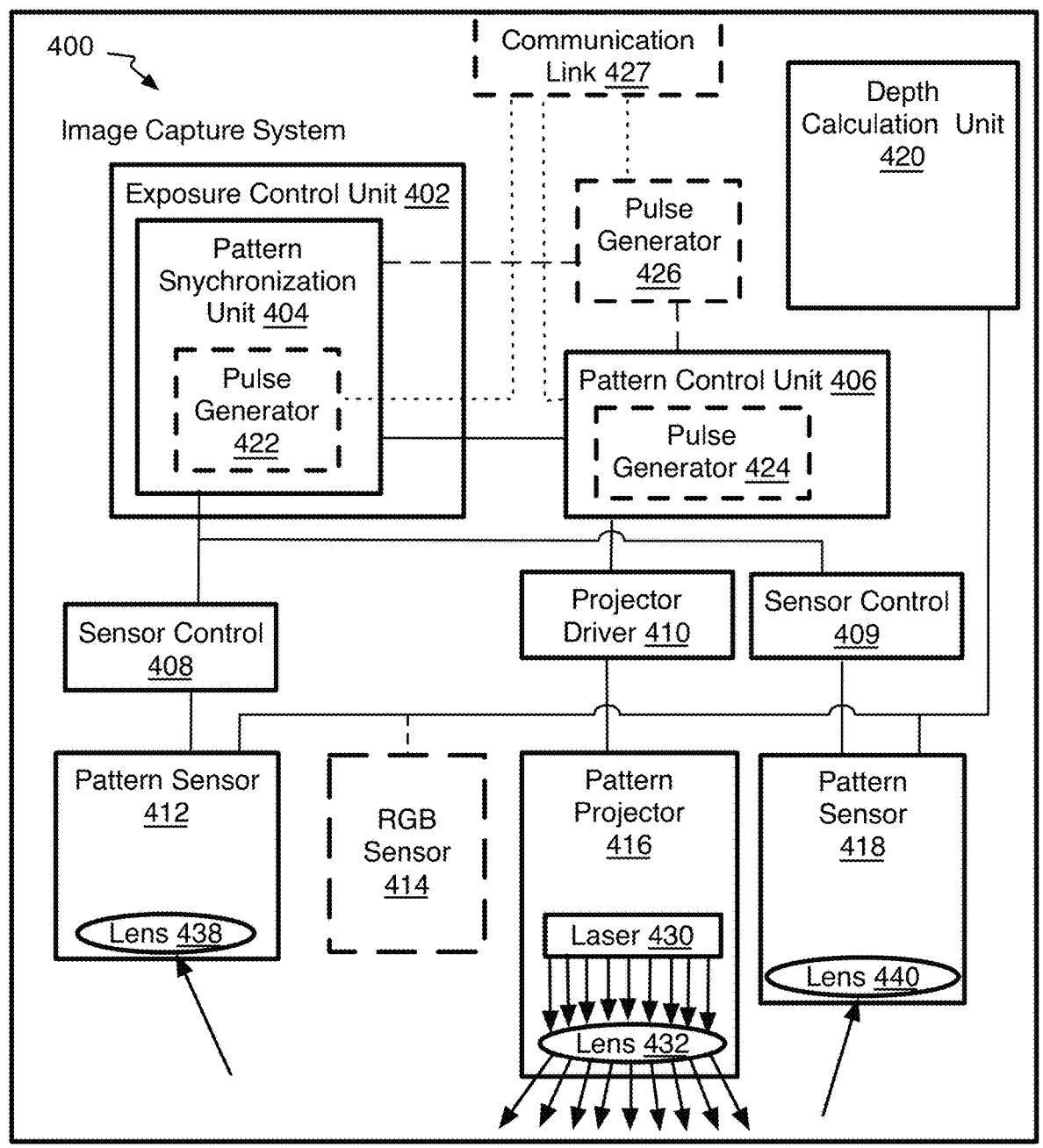
FIG. 4 is a schematic diagram of a depth measurement system to provide depth measurements on an imaging device.

Referring to FIG. 4, an image capture system 400 is arranged to perform the implementations herein. The image capture system 400 has an exposure control unit 402 with a pattern synchronization unit 404. The exposure control unit 402 sets the timing of the starting and stopping of the exposure on pattern sensors 412 and 418 via sensor controls 408 and 409. A pattern control unit 406 sets the timing and other parameters for a projector driver 410 that operates a projector 416. An RGB sensor 414 may be provided as well when the pattern sensors are not also RGB sensors. The RGB sensor 414 may be used to provide pixel color image data.

System 400 may have many different configurations in order to implement the exposure control and pattern projection methods herein. Thus, the system 400 may be a single device (such as a single camera with multiple sensors) or multiple devices (such as multiple cameras), or may include separate components on a single device (such as a smartphone or tablet with multiple cameras and a separate projector). By one example, the sensors 412, 418, sensor controls 408, 409, and exposure control unit 402 may be considered to establish, or be part of, one or more cameras, while the pattern control unit 406, projector control 410, and pattern projector 416 may establish, or may be considered to be part of, a projector (or laser or light source) separate from the cameras, but may or may not be on the same device, such as on a smartphone or tablet. There also may be a pulse generator 422 that may be considered part of the pattern synchronization unit 404 and one or more cameras, and/or a pulse generator 424 considered to be part of pattern control unit 406 and/or a light source. Otherwise, a pulse generator 426 may be part of either, both, or neither the camera(s) and the projector, and may be programmable. The location of the pulse generator may depend upon which component(s) are considered the slave, and which are considered the master as explained in greater detail below.

A microcontroller may provide one of the programmable pulse generators to vary the pulse width and frequency so that it is a fairly flexible system. The microcontroller can be programmed with default values for the pulse generator and the frequency. Alternatively, a communication link 427, such as i2c, may be used to change the pulse settings. For one example, a pre-defined sequences of pulses (such as a burst at the beginning of the frame period), may be set at the pulse generator 424. These could be selected over the communication link 427. In this latter situation, where the pulse generator at the laser sets the pulse rate, the laser is considered the master unit.

In a typical CMOS sensor the duration of the interval between resetting the pixel and reading it is used to determine the exposure time. In the CMOS sensor utilized here, a transfer gate or other electronic method is used to determine the exposure time of the pixels and may be enabled/disabled multiple times during the exposure. This can be used to provide the multiple exposures during a single frame period. In this system, either the exposure gate is controlled by an external pin for "slaving" the sensor to the IR projector light source as explained herein, or an on-board programmable pulse generator is used to provide an appropriate pulse to synchronize the light source. In conventional shutter cameras, the pulse generator for the reset and read gates controls duration and the phase (time from the start of frame). In the present method, an additional parameter, pulse rate, would be used also as described below.

Specifically, these components provide the ability to synchronize the exposures to the pulsed light source during the frame in many different ways. The camera (sensor(s)) may be slaves to the projector, or the projector may be a slave to the camera(s), or there may be a combination of both, and by one form depending on which component has the pulse generator, in order to synchronize the timing of when the exposures take place.

When the camera (sensors) is a slave to the master light source, the slave camera(s) receive an input from the master light source, or in other words, the master light source provides a synchronization to the slave camera. In this case, the camera sensors accept electrical synchronization signal(s) that would allow an external source to control the pattern of exposures of the camera's exposure control.

By this example of system 400, the pattern control unit 406 is the master and has pattern settings which may be set via pulse generator 424 or a communication link 427 thereto. The pulse settings may include the frequency, duration (or pulse width), and non-uniform (or bunching) timing of the pulses when provided (which may be considered to be included in the frequency determination), and per frame period, as well as the power. The target emission wavelength of the projection pulses may be fixed and set in compliance with sensor configuration limitations, such as on an IR CMOS sensor (or IR RGB CMOS sensor) arranged to detect 940 nm light. The settings are provided to the projector driver 410 to operate the projector 416 to emit the desired pulse pattern through a lens 423 by controlling a laser 430.

The settings also may be provided to the pattern synchronization unit 404 so that exposure time settings may be set to match the durations of the individual pulses. The exposure time settings are then provided to the sensor control 408 or 409 to control the exposure on the sensor 412 or 418 to perform the exposure timing according to the exposure settings and detect the light from the projection through lenses 438 and 440.

Alternatively, when the light source (projector/laser) is a slave to the master camera(s) or sensor(s), the master camera transmits an output to the slave light source. In this case, the slave light source can be triggered with an external synchronization from the master camera, and the camera may have the controlling pulse generator to communicate to the laser to trigger the generation of a pulse. Specifically, for the example of system 400, now the pattern synchronization unit 404 of the exposure control unit 402 may have the pulse generator 422 to send electronic signals to the pattern control unit 406 to set the pulse parameters at the projector driver 410 to control the projector 416 in accordance with a pulse plan or pattern (or pulse rate). The pattern synchronization unit 404 also would set the exposure durations according to the pulse pattern, and provide the exposure parameter settings to the sensor control 408 and 409 to control the exposure on the sensor 412 or 418 to perform the exposure timing according to the pulse pattern.

There are many options as to exactly what and how the camera may control the pulses, and what may be included in the pulse plan or pattern (or pulse rate). The camera output pulse/pulses could be a simple trigger to initiate a pre-set pulse pattern (or pulse rate), or also could control the width of the pulse. If the pulse generator 422 resides in the camera, there may be an interface, such as for communication link 427, where one could communicate with the camera to define the pulse parameters. The camera could also adjust the number of pulses to facilitate exposure. The pulse generator in the camera could have features that help to ensure safety and proper laser operation as described herein. For example, it might have limits to the number of pulses/frame or the pulse width or a combination of both. Also, when the camera(s) is a master, the camera may generate signal(s) that indicate when an exposure was taking place, and the light source may accept electrical synchronization signals to provide light during the exposure period. It will be understood of course that the pattern control unit 406 may make many of these settings when the projector is the master component.

By yet another option, the pulse generator 426 may be provided, and may be considered separate from both the camera(s) and projector, such as a separate microcontroller communicating with camera(s) and projector on a smartphone or tablet for example. The pulse generator 426 may perform any of the tasks that could be performed by pulse generator 422 and 424.

The sensors 412 and 418 may be complimentary metal-oxide silicon (CMOS) sensors that work more like a traditional film in that the whole image is "exposed" at the same time. The sensor may be pixelated so that photons (and in turn charge) are collected for each pixel (or block of pixels) locations on the sensor surface and all the pixels are exposed in unison for a period of time as in global shutter operation, or are staged such that the exposure time ends just prior to the readout of each row as in rolling shutter mode of operation. The camera here, however, can be integrated for short durations and triggered multiple times during a single frame period. Triggered multiple times refers to performing an exposure more than once during the frame time or period, and the frame period is the period of time where an exposure is accumulated for a reading and capturing of a single image, before it is reset for the next frame.

The sensor may each include switches (transistors) that control when the capacitor integration occurs (or in other words, exposure when the photosensitive part is connected to a capacitor of the sensor) and when it is read (the capacitor is connected to an analog-digital convertor (ADC)), and when it is reset (where the capacitor is set to the black level). For shorter exposures during a single frame period (such as those at an IR pulse as described herein), the photosensitive portion is connected and disconnected to and from the capacitor without the read and reset operations, thereby collecting the charge during the multiple pulses and at pixel locations until the end of the frame period when a read of the charge amount occurs, and then the capacitor is reset. There are no read and reset operations during each small exposure that is turned on during a single pulse of the multiple pulses so that charge is accumulated at individual pixel locations. Note that other methods may be used to affect the same result of collecting charge only when the pulsed light is active and not when the pulsed light is inactive.

By one example form, the sensors may be complementary metal-oxide-semiconductor-type image sensor (CMOS) infra-red (IR) detecting sensors optimized to have good response at 940 nm, Note that the methods herein may work with many image sensors capable of delivering acceptable performance when imaging at 940 nm. In the example herein, there are manufacturers that have developed a sensor with very good quantum efficiency in the NIR range, and particularly at about 940 nm detection with novel and proprietary techniques. Various techniques may also be used to improve the overall light collection efficiency. These techniques may include the use of stacked dies or layers, where each die or layer is optimized for the specific tasks. One die or layer may be optimized for optical conversion efficiency while another for electronic control and readout out.

As to the projector, by one possible example, a VCSEL projector is used and that emits light vertically or perpendicular to the face of the diode, and in turn the circuit board upon which it the diode sits, rather than to the side as in conventional lasers that require a prism to redirect the light in a direction perpendicular to the circuit board. The VCSEL projector provides a wide latitude for safety (where the power used to attain the 940 nm light emission is well below the safety limits as explained below). In one example, the pulse width may be pre-selected, and the frequency may be adjusted for a pre-selected input power or alternatively a pre-selected optical power. The actual frequency needed will be determined depending on the component variations. The analog components for the laser system for the VCSEL may be fail safe so that the laser cannot be operated in an unsafe condition. The VCSELs also perform more reliably than conventional lasers and LEDs. VCSEL projectors operating at 940 nm are available from a variety of companies including Princeton Optronics and Vixar.

It should be noted that other lasers and sensors could work. Silicon CMOS sensors, the most prevalent, typically do not have a sufficient response at desirable longer wavelengths at more than the 850 nm for example, and conversely shorter wavelengths into the visible range would affect the visible RGB sensor. Other types of sensors may be used for pattern light detection to obtain wavelengths other than 940 nm that have a low sunlight energy. Also, other technologies exist such as LEDS and lasers that are not necessarily VCSEL technologies but that still may be used to provide the projector. These other types of lasers should have features to ensure safe operation as required by FDA certification (e.g. the laser should be tolerant of single point failures), and so forth.

Once the light is detected, or more specifically a light detection charge is collected, the pattern sensors will convert this charge to electrical signals and a depth calculation unit 420 may use this data. Then depth calculation unit 420 may perform tasks such as feature matching of points of two images from the two (or more) sensors, and then depth calculations to obtain the (X, Y, Z) 3D space pixel coordinates to form a 3D space. The depth calculation unit 420 then may provide a depth map for further processing.

Figure 5:
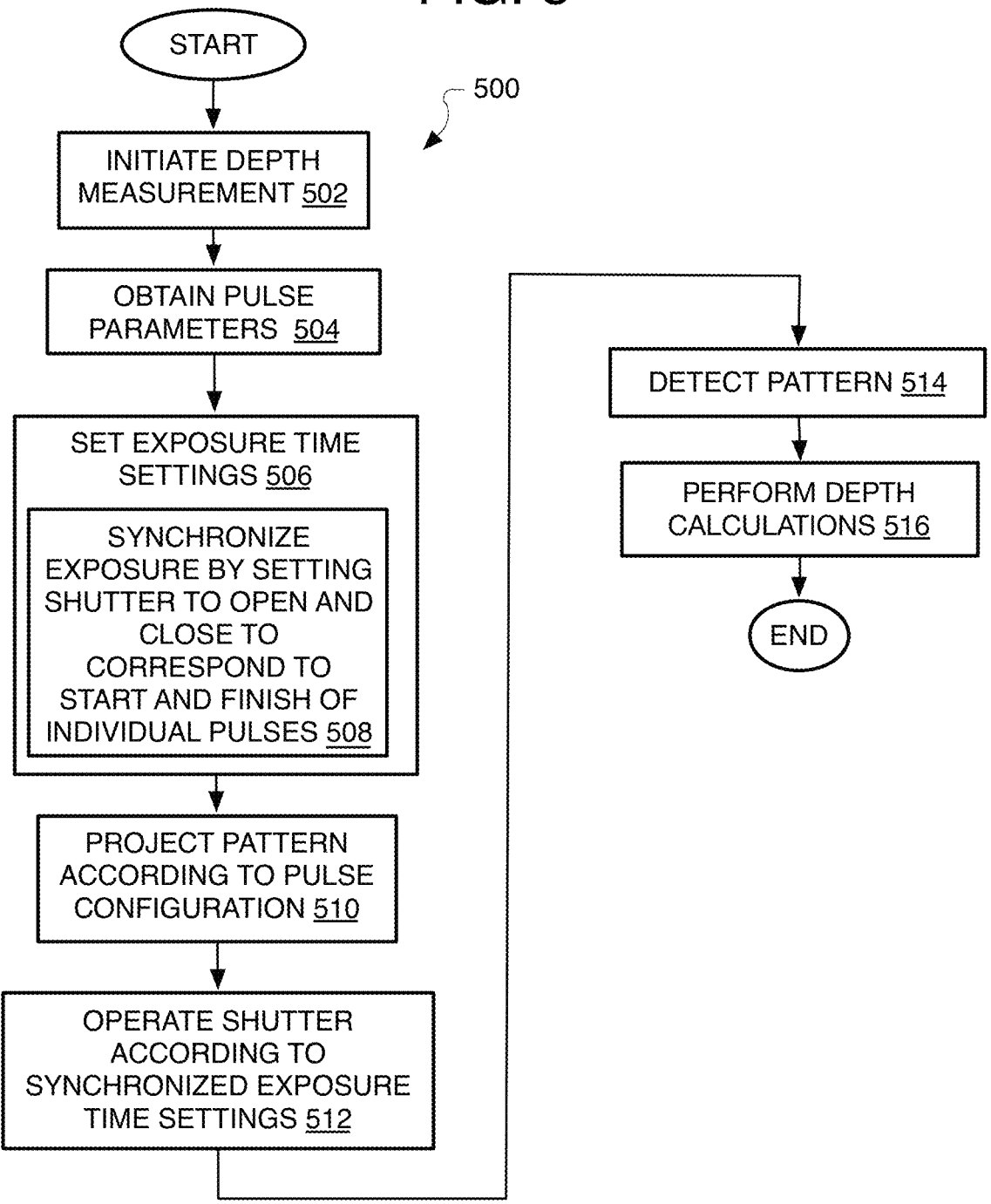
FIG. 5 is a detailed flow chart of a method of exposure control and pattern projection in accordance with the implementations herein.

Referring now to FIG. 5, an example process 500 for automatic exposure control and pattern projection for cameras described herein is arranged in accordance with at least some implementations of the present disclosure. In the illustrated implementation, process 500 may include one or more operations, functions or actions as illustrated by one or more of operations 502-516 numbered evenly. By way of non-limiting example, process 500 may be described herein with reference to example image processing system of FIGS. 1, 1A, 4, and 13 where relevant.

Continuing now with process 500, process 500 may include "initiate depth measurement" 502, which may be processes that are activated whenever an image is being captured by an imaging device, or may occur when a user hits a certain button or sets certain settings on the imaging device. It will be understood that the use of multiple exposures in a single frame period on a sensor may be used for other purposes other than depth measurement, and the operations described herein merely provides one example of its use.

Process 500 may include "obtain pulse parameters" 504. For setting the pulse parameters, the parameters are pulse amplitude, pulse width, and frequency. These can be adjusted to obtain a desired overall average power level. For a VCSEL laser, this laser is most efficient when driven between 6 amps and 20 amps. So for a start, there is a range of best amplitude in which the laser should be operated. Once the amplitude is set, it is fixed, and may be fixed for the image capture device going forward, but otherwise may be fixed for other periods (as long as the camera is on, or per frame, for example).

Before continuing with process 500 to perform the light pattern detection, however, a few preliminary functions are, or were, performed during manufacture of the image capture device for example, and as explained herein to set the pulse parameters in the first place. Particularly, the projector was selected to emit a certain wavelength, and the pulse rate may have been pre-determined as well. The details for this selection and setting are as follows.

As mentioned with the processes disclosed herein, one goal is to maximize the exposure component of light of the projected pattern versus the background light. In that sense, the processes herein attempt to maximize the sensitivity to the pattern (such as pattern 200 of FIG. 2). This may be referred to as improving the Signal-to-Noise ratio (SNR or S/N ratio), where the projected pattern is the desired signal and the background light is the noise.

In more detail, sunlight rejection is a challenge for all active depth cameras because laser projection systems typically cast about 850 nm light which has been found to be the best compromise between sensor response, laser efficiency, and eye safety on many conventional systems. This raises a large problem because the sun has a strong 850 nm content and air is relatively transparent to 850 nm light (i.e., there is less absorption of the light in the atmosphere at 850 nm).

This cannot be solved simply by only decreasing the exposure time. Reducing the exposure time reduces the sensitivity to the projected signal. In other words, the sensitivity of the sensor (camera) is a fixed quantity. A sensor with higher sensitivity would require a shorter exposure for a given intensity of light, versus one with a lower sensitivity. With too much exposure, the sensor is saturated and reaches a maximum value. With too little exposure, the sensor remains at a minimum value and does not sense the incoming light.

This also cannot be solved simply by increasing the projector power so that the projected pattern cannot be washed out by sunlight because it raises both (1) thermal issues, and (2) eye safety limits. Regarding the thermal problems, simply stated, if one only increased the laser power, it is possible to overcome sunlight. But this would require an enormously powerful laser, which most likely will not be eye safe, and it would most likely dissipate a lot of heat (it may also require a very large battery for mobile applications).

The solution provided here improves the SNR for an image capture system, and that may use an assisted-3D stereoscopic system that uses an adaptive exposure modulated shutter CMOS sensor to improve its robustness to ambient illumination and specifically to improve its outdoor operation by at least 10 times.

Figure 6:
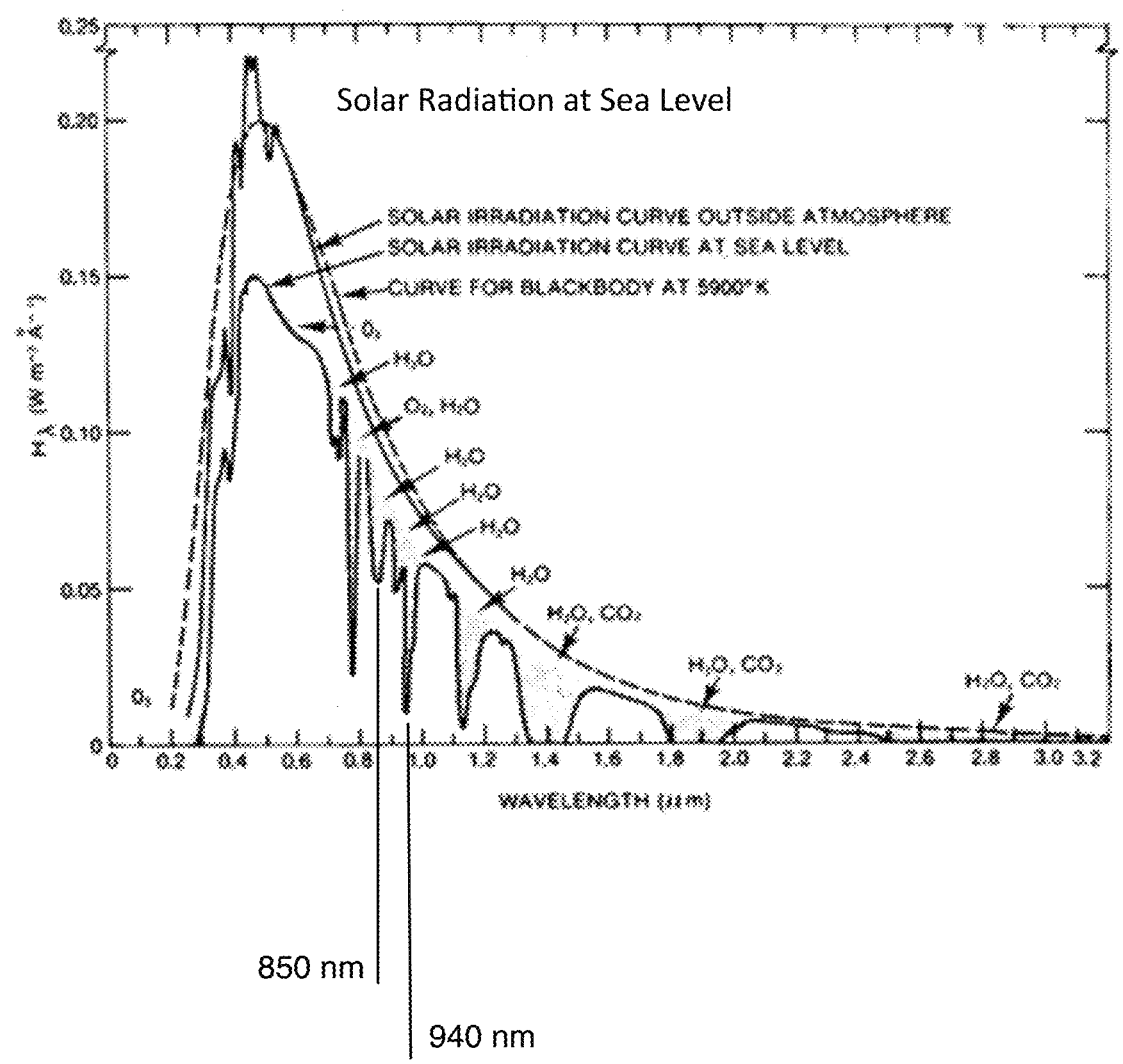
FIG. 6 is a solar radiation graph.

Referring to FIG. 6, one way to increase the SNR is to select a light wavelength that has less radiation (less energy) by sunlight so that it will not be so easily washed out by the sunlight. A solar radiation at sea level chart 600 is provided to show the different energy (or solar irradiation) at different wave lengths. As indicated, 940 nm light has a much lower (by 5×) radiation than at 850 nm which is one of wavelengths used by conventional IR projectors. Specifically, the solar radiation chart shows that 940 nm wavelengths have sunlight (solar irradiation) reduced 5× (0.05 to 0.01 Hλ(Wm-2 Å-1)). In other words, sunlight includes 5 to 10 times less radiation (or less energy or more atmosphere absorption of the energy or sunlight) at 940 nm versus 850 nm. So by tuning the system to work at 940 nm, the system can improve the signal to noise ratio as mentioned herein. This suggests the use of a 940 nm laser (or LED or VCSEL) and to have the sensor more sensitive to 940 nm light (versus other wavelengths). It may also include adding appropriate optical filters when needed in order to attain the 940 nm light emission.

Another way to boost the SNR is to pulse the light pattern projection at some duty cycle and frequency, and during a single frame period. A frame period is defined as the time required to complete a read operation of the sensor, or the time it takes to capture a single image, as mentioned above. By pulsing the laser, the process or system maximizes the efficiency of the system especially when the laser is synchronized to the exposure so that the laser is off while the exposure is off as explained below. When the exposure time is reduced and the laser pulse energy is increased, this improves the S/N ratio until some practical limitation is reached based on factors such as the speed at which the sensor can gate the exposure time, speed at which the laser driving circuit can efficiently provide laser pulses, and eye safety concerns.

To state it another way, the method and system disclosed herein revolves about the ability for the laser driving circuit to efficiently provide laser pulses taking into account reasonable pulse power, input voltage, component sizes, and costs, as well as eye safety. By one form, a capacitor may be used to store energy used to pulse the laser. By having a series of smaller pulses throughout the frame time instead of a single pulse at the beginning of the frame time, the size of the capacitor is greatly reduced. Not doing this results in an impractically (for a mobile form factor) large capacitor. So the multiple pulses per frame time provides three advantages: (1) the pulse circuit uses a small capacitor, (2) the S/N ratio is improved by limiting the exposures to occur during the pulse durations as described below, and (3) eye safety is better because the energy in each pulse is much smaller (even if the peak amplitude is higher) than a single pulse scenario so that the system complies with a single pulse MPE limit. (2) and (3) are discussed in detail below.

Using sufficiently short pulses at high intensity also improves the efficiency of a laser light source (e.g., overcomes threshold current losses). For "threshold current losses", the laser does not produce any "laser light" until a threshold current is reached. The amount of current up to the threshold current is essentially wasted as heat. Any additional current is converted into light at some conversion efficiency (often stated watts/amp). So the light out is roughly:

Light Output=(Current Input−Threshold Current)*Conversion Efficiency

So it is desirable for the input current to be significantly higher than the threshold current to have a good overall power efficiency.

Next, the pulse width may be set. In the case of a particular driver implementation, it has been found to be most efficient in producing pulses with pulse widths in the 250-800 ns range. The exact pulse may be determined with experimentation and varying the many parameters of the specific components.

Also, the frequency may be set to achieve the desired power. In any case, the system must attempt to ensure that the pulses (single or the train of pulses) meet the class 1 eye safety limit. Specifically, the eye safety threshold may be based on other factors in addition to the frequency of the IR light projection pulses. The specification of the International Standard, IEC60825-1, Safety of Laser Products, edition 1.2

(1993, 1997, 2001), a table of Acceptable Emission Limits (AEL) and a table of Maximum Permissible Exposure (MPE) (p. 52) may all be used, see sections 8 and 9 particularly.

The MPE looks at the peak energy in a single pulse and the integral (i.e., total combined) value of a train of pulses (or in other words, as related by the average power value over a time period for example). In the present case, by shifting to the train of pulses under the appropriate conditions, it is safer to provide an average energy over a frame period that has energy peaks that would not be acceptable for a single pulse pattern.

To determine the safety threshold, first the applicable number of pulses, the applicable duration of exposure, and a number of constants is determined as described in the chart below and the IEC standard mentioned above, and these values are then plugged into an equation as that shown below:

laser is pointed at a person, it will not injure the person. At higher levels of power, the laser could be classified as Class 3× or above (class 2 is reserved for visible wavelengths), which may be hazardous. The class 1 lasers are used here. It should be noted that a different equation may be used to obtain the peak safety thresholds depending on the pulse width.

By one example form, a 200 kHz average power per frame period threshold was determined by using a RealSense™ R200 laser projector, but other projectors may have very different limit values. Specifically, and in simplified terms, it was determined that with laser modulation with pulse frequency <200 kHz, the eye safety threshold applies to the peak, not the average power over a frame period. However, when a laser is modulated at a pulse frequency >200 khz (so that the pulses are closer to each other), the threshold peak power can be increased inversely and pro-

| Exposure time t in s Wave-length λ in nm | $10^{-13}$ to $10^{-11}$ | $10^{-11}$ to $10^{-8}$ | $10^{-9}$ to $10^{-7}$ | $10^{-7}$ to $1.8 \times 10^{-5}$ | $1.8 \times 10^{-5}$ to $5 \times 10^{-5}$ | $5 \times 10^{-5}$ to $1 \times 10^{-3}$ | $1 \times 10^{-3}$ to $10$ | $10$ to $10^2$ | $10^2$ to $10^3$ | $10^3$ to $10^4$ | $10^4$ to $3 \times 10^4$ |
|---|---|---|---|---|---|---|---|---|---|---|---|
| 180 to 302.5 | $3 \times 10^{10}$ W·m$^{-2}$ | | | | | | 30 J·m$^{-2}$ | | | | |
| 302.5 to 315 | | | | | $C_2$ J·m$^{-2}$ ($t > T_1$) ($t \le T_1$) | | | | $C_2$ J·m$^{-2}$ | | |
| 315 to 400 | | | | | $C_1$ J·m$^{-2}$ | | | | $10^4$ J m$^{-2}$ | | 10 W m$^{-2}$ |
| 400 to 700$^4$ | $1.5 \times 10^{-4} C_6$ J·m$^{-2}$ | $2.7 \times 10^4 t^{0.75} C_6$ J·m$^{-2}$ | $5 \times 10^{-3} C_6$ J·m$^{-2}$ | $18 t^{0.75} C_6$ J·m$^{-2}$ | | | 400 to 600 nm$^d$ | Retinal photochemical hazard 100 $C_3$ J·m$^{-2}$ using $\gamma_p = 11$ mrad | 1 $C_3$ W·m$^{-2}$ using $\gamma_p = 1.1 t^{0.5}$ mrad | 1 $C_3$ W·m$^{-2}$ using $\gamma_p = 110$ mrad | |
| | | | | | | | 400 to 700 nm$^d$ | AND$^3$ Retinal thermal hazard a ≤ 1.5 mrad: 10 W·m$^{-2}$ a > 1.5 mrad; 18 $C_6 T_2^{-0.25}$ W·m$^{-2}$ ($t > T_2$) ($t \le T_2$) 18 $t^{0.75} C_6$ J·m$^{-2}$ | | | |
| 700 to 1 050 | $1.5 \times 10^{-4} C_4 C_6$ J·m$^{-2}$ | $2.7 \times 10^4 t^{0.75} C_4 C_6$ J·m$^{-2}$ | $5 \times 10^{-3} C_4 C_6$ J·m$^{-2}$ | $18 t^{0.75} C_4 C_6$ J·m$^{-2}$ | | | | a ≤ 1.5 mrad: 10 $C_4 C_7$ W·m$^{-2}$ a > 1.5 mrad: 18 $C_4 C_6 T_2^{-0.25}$ W·m$^{-2}$ ($t > T_2$) ($t \le T_2$) 18 $t^{0.75} C_4 C_6 C_7$ J·m$^{-2}$ | | | |
| 1 050 to 1 400 | $1.5 \times 10^{-3} C_6 C_7$ J·m$^{-2}$ | $10^5 t^{0.75} C_6 C_7$ J·m$^{-2}$ | $5 \times 10^{-2} C_6 C_7$ J·m$^{-2}$ | $90 t^{0.75} C_6 C_7$ J·m$^{-2}$ | | | | | | | |
| 1 400 to 1 500 | $10^{12}$ W·m$^{-2}$ | | | $10^3$ J·m$^{-2}$ | | | $5 600 t^{0.25}$ J·m$^{-2}$ | | | | |

A) 100 $C_3$·J·m$^2$ using $\gamma_p$=11 mrad
B) 1 $C_3$·W·m$^2$ using $\gamma_p$=110 mrad
C) α≤1.5 mrad:10 Wm$^{-2}$ and α>1.5 mrad: $18 C_6 T_2^{-0.25}$ Wm$^{-2}$
D) α≤1.5 mrad:$10 C_4 C_7$Wm$^{-2}$ and α>1.5 mrad: $18 C_4 C_6 C_7 T_2^{-0.25}$ Wm$^2$
E) $1.5 \times 10^{-4} C_4 C_6$·J·m$^{-2}$
F) $2.7 \times 10^4 t^{0.75} C_4 C_6$·J·m$^{-2}$
G) $1.5 \times 10^3 C_6 C_7$·J·m$^{-2}$
H) $2.7 \times 10^5 t^{0.75} C_6 C_7$·J·m$^{-2}$ The relevant equations from the above chart for NIR wave lengths 700 to 1,050 are shown for the exposure time from 10 to $(3 \times 10^4)$ columns. According to the specification, Class 1 is a Laser that is safe under reasonably foreseeable conditions of operation, including the use of optical instruments for intra beam viewing. In other words, if this type of portionally to the duty cycle (percentage of frame period with total pulse duration) while maintaining required average power:

$D=T/P$

T=time the signal is active (on) and P is the total period of the signal (here frame period)

Power $p$ increase=$1/D=P/T$

For example (just using random numbers for the example), if T/P=0.3 (the pulses are on about ⅓ of a frame period), then the peak power may be increased by 3.33. Of course, there still may be a threshold for average power per frame period that must be complied with. Thus, shutter modulation mitigates eye safety enabling significant increase in peak power. This conclusion can be exemplified by the following examples in FIGS. 7-12.

Figure 7:
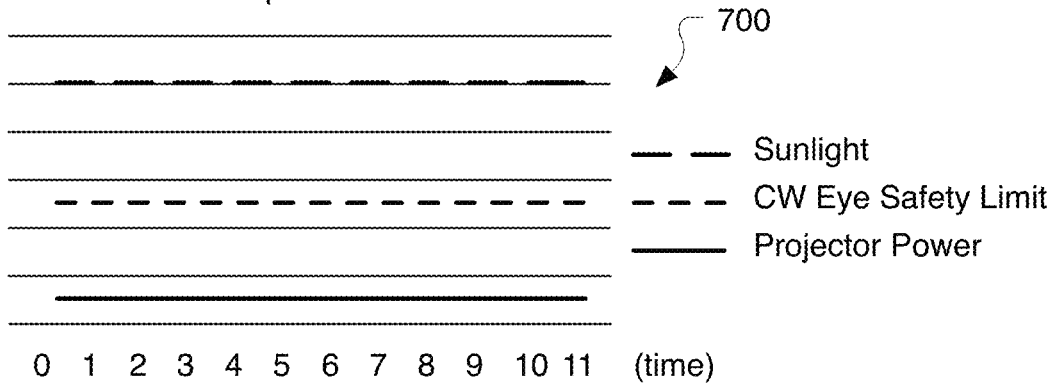
FIG. 7 is a chart of thermal limitations for continuous wave laser operation.

Referring to FIG. 7, a power level graph 700 shows thermal limitations for a continuous wave operation. Thus, graph 700 shows that the projector power must continuously remain below a continuous wave (CW) eye safety limit, which is below the sunlight power equivalent.

Figure 8:
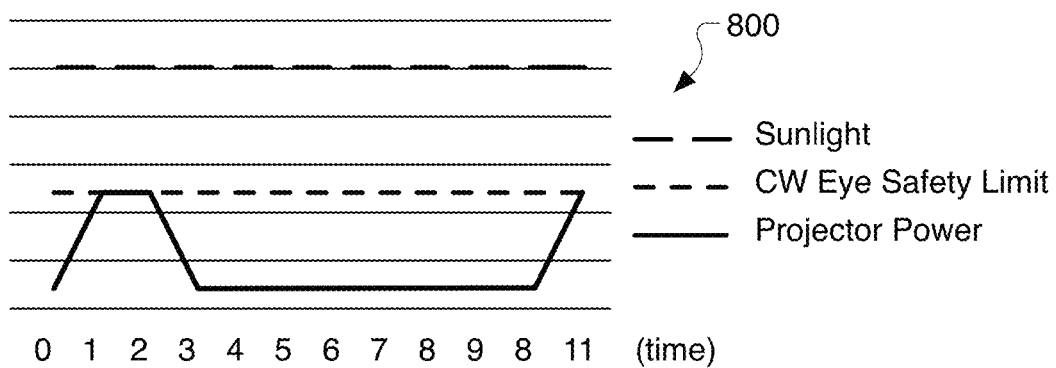
FIG. 8 is a chart of eye safety limitations for pulsed laser operations.

Referring to FIG. 8, a power level graph 800 shows eye safety limits for a single pulse operation. As shown, the pulse may undesirably equal or exceed the CW eye safety limit when the limit is based on peak projector power so that such a configuration would not pass eye safety approval tests. It should be noted that the single pulse alternative may have the equivalent energy (same direct current (DC)) as a continuous laser.

Figure 9:
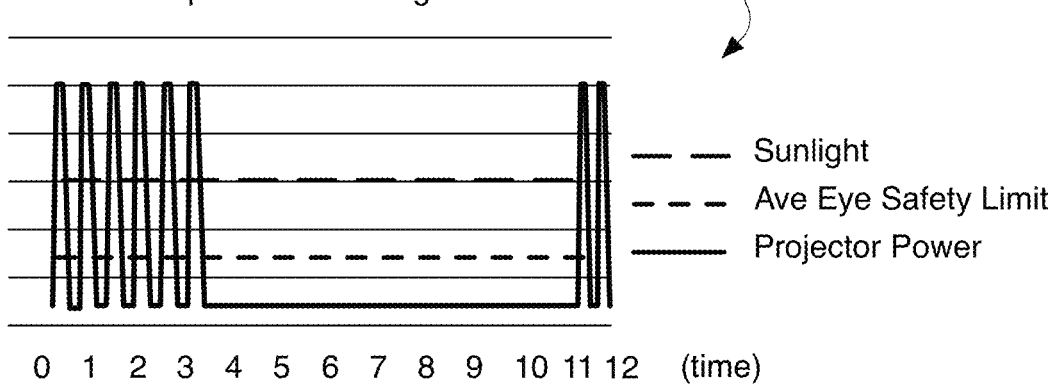
FIG. 9 is a chart of average power limitations for modulated laser operation.

Referring to FIG. 9, a power level graph 900 shows an average power limitation with a modulated operation of the projector power, and specifically, in pulses grouped together in one part of the frame period leaving a long non-pulsed section for the frame period for this example. As explained herein, this results in a significantly reduced average power over the frame period due to the 0 power duration that provides balance against the higher power pulses. While not shown, it is understood that the actual average power is below the average eye safety limit that is shown. As to the laser power levels used to obtain the desired wavelengths, such as 940 nm, by one form, IEC60825 standard discloses that the power is the same for range from 700 nM to 1050 nM light, and the same calculations are applied. Thus, for the difference in power to obtain 850 nm or 940 nm, there may not be an expected difference in power due to wavelength. It is the pulse configuration (and frequency) that will decide which power (peak or average or other value over a frame period) that is key to satisfying the eye safety standards.

Some rough power values may be set similar to the following example. If it is assumed 0.150 W total output power is Class 1 safe, and a 50 KHz repetition rate (frequency), each pulse would be 3E-6 W (e.g. 0.150/50000). In terms of energy, if it is assumed each pulse is 1E-6 S, then the pulse energy is 3E-12 Joules (or 3 pico Joules). Again, these values may be very different depending on the laser and other factors mentioned herein. In one experiment, a request for power input (not optical output) was found to be around 400 mW. For this, a prototype was running around 25 Khz with a 375 nS pulse. This should provide a very high safety margin.

Optionally, the desired power might be set lower than the eye safety limit in order to limit the drain on the battery if it is a portable device, to limit the skin temperature of the product, or some other factor. The power might be lowered when the full range of the depth camera is not needed, or when the camera is being used indoors to name a few examples.

Also as mentioned above, the pulse parameters, or pulse rate or pattern, per frame period may be pre-set and fixed on the devices (and particularly at the one or more pulse generators), may be calculated at the pulse generator, or may be received by a communication link from another component remote from the projector or remote from the device the projector is part of, or other options as may be contemplated, some of which are mentioned for system 400 above, and may include whether the projector is the master or the camera/sensors is the master as already discussed above as well. In one form, adjustment of the pulse width and frequency are performed digitally so that they are easy adjustments to make, and once set, the amplitude may be fixed.

The process 500 then may include "set exposure time settings" 506, and this may include "synchronize exposure by setting exposure start and finish to correspond to start and finish of individual pulses" 508. Particularly, in order to increase the SNR the CMOS sensor could be triggered to expose a fraction of a frame time (or frame period), and then burst the IR Projector at substantially the same time.

The reason to provide the synchronized exposure times is as follows. Whenever the sensor is in the mode to capture light (exposure is on), and the laser is on, then it is capturing sunlight and laser light. When the laser is off, the sensor still may be capturing sunlight (unless it has a physical shutter as well), but now only sunlight is being captured which may add to the charge being collected by the sensor throughout the frame period. Countermeasures to this are referred to as sunlight rejection. So in order to reduce the capture of sunlight and improve sunlight rejection, it is best if there is no exposure when the laser is off.

In the present system and methods, by altering the exposure mechanism of a sensor system, it is possible to synchronize a series of short duration light pulses with the exposure of the sensor throughout the frame time and to achieve the same result as a single, longer pulse at the beginning of the frame. This significantly relaxes the drive requirements and eye safety concerns for the laser IR projector, such as a pulsed VCSEL, LED, or laser projector.

As the exposure is shortened, which can be a single exposure time per frame as a conventional global shutter camera, or multiple exposures per frame, as in this present process, while increasing the energy in the projected image, the contribution to the background light from sunlight or other external lights is reduced while maintaining the contribution of the projected light.

Figure 10:
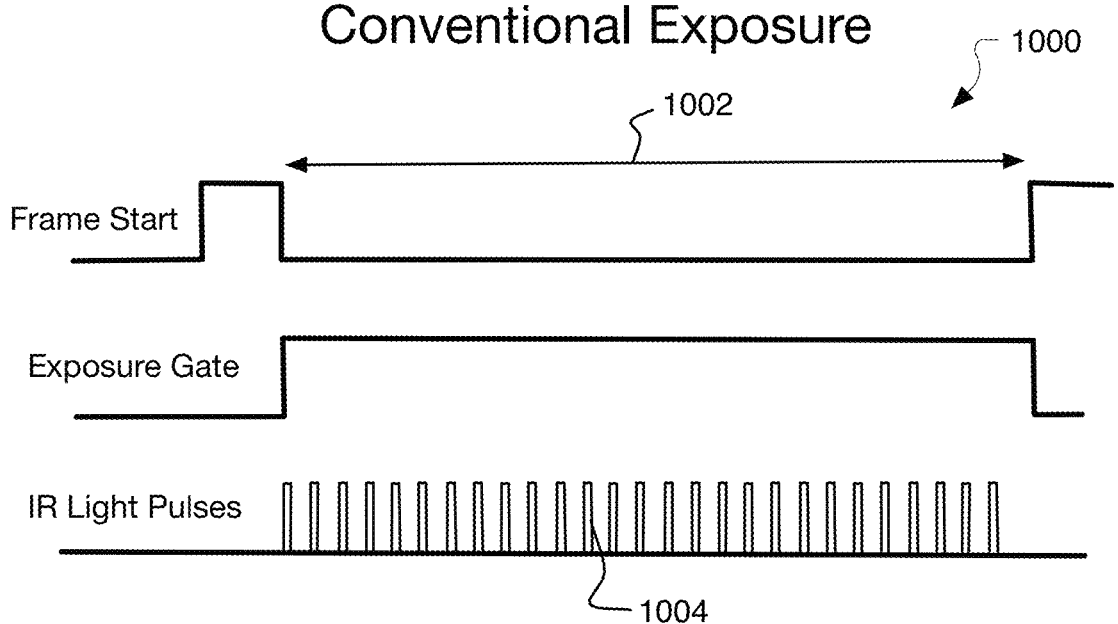
FIG. 10 is a graph of conventional projection times used with conventional exposure times.

For instance, referring to FIG. 10, a timeline graph 1000 illustrates the conventional case using a pulsed light IR projector with a full frame exposure. In this case, daylight (noise) is integrated over the full frame time 1002. The graph 1000 shows frame, exposure gate, and IR light pulse frequencies, and with light pulses 1004 emitted at a uniform frequency along the entire frame period 1002. This results in an undesirable low SNR since a substantial amount of light contributes to the collected charge between the projected light pulses.

Figure 11:
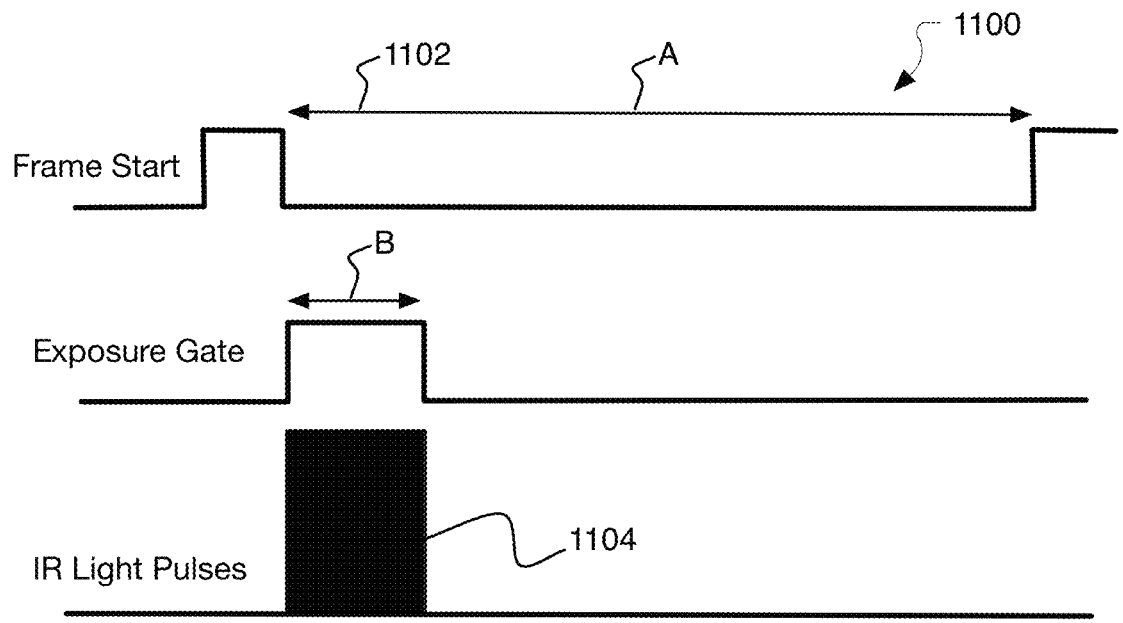
FIG. 11 is a graph of possible enhanced projection times used with conventional exposure times.

Referring to FIG. 11, a timeline graph 1100 "enhanced S/N with adaptable exposure" provides a first attempted solution. By bunching up all the pulses at the beginning of the frame to form a continuous exposure as a single large pulse 1104 in one part of a single frame period 1102, the signal to noise ratio can be improved by a factor of A/B where A is the frame period and B is the total exposure duration performed during the large pulse 1102 and by the exposure gate on FIG. 11. The single pulse is formed by eliminating the off periods between light pulses to form a continuous on period. However, this pulse pattern increases the performance requirements of the laser and the laser drive circuit, and may result in a pulse that does not meet the eye safety peak threshold as mentioned above for chart 800 (FIG. 8).

Figure 12:
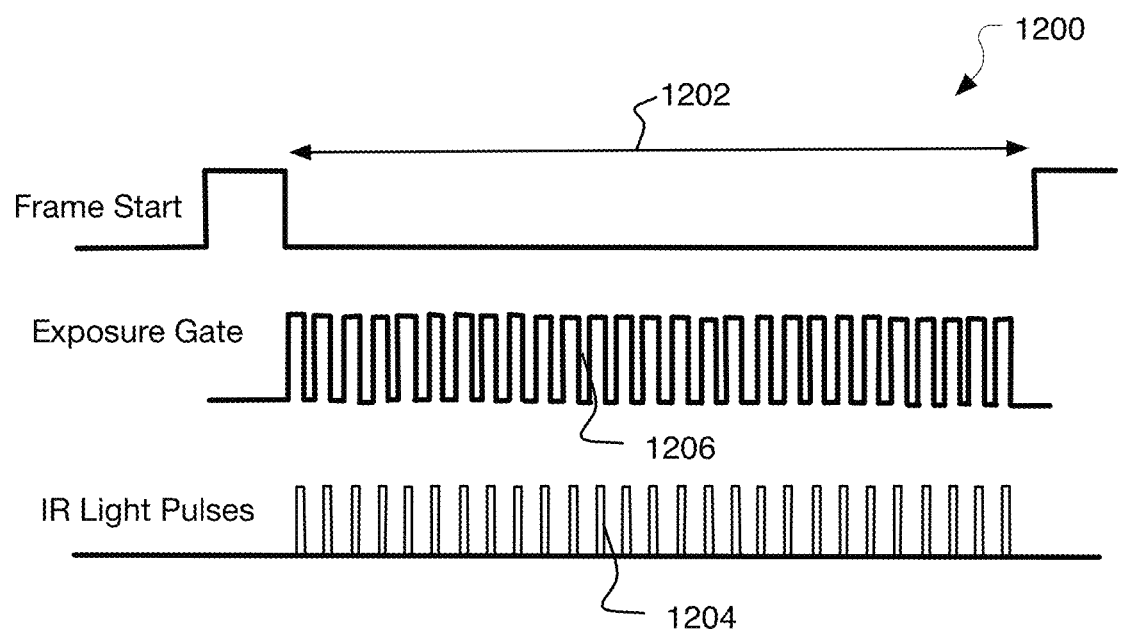
FIG. 12 is a graph of projection and exposure times applying implementations herein.

Referring to FIG. 12, a timeline graph 1200 "enhanced S/N with adaptable exposure" illustrates the agile or adaptable multiple exposure configuration where the exposure times are synchronized to the light pulses. Here, the same or similar signal-to-noise ratio is achieved without the need for a long pulse duration. In this alternative, a uniform frequency of light pulses may be used along the entire frame period 1202 with the exposure gate turning the exposure on and off in durations 1206 that correspond to the pulses 1204.

The methods and system herein present at least two options. First, an enhanced S/N with adaptable exposure option (FIG. 12) provides a pulse configuration with a substantially uniform frequency for the pulses throughout the entire frame period. This option may enable achievement of the highest overall power while remaining eye safe, and it also may be easier on a pulse circuit. Second, another pulse configuration (FIG. 9) bunches the pulses in the beginning of the frame period, and with a higher power, and omits the pulses in a large section of the frame period in order to maintain an overall average power level for the frame period. This second option may reduce motion blur and be better for an object that is moving.

As to the duration of each exposure time, the exposure times may be set to start several ns before the start of the pulse, and end several ns after the end of the pulse to better ensure all of the projected light is efficiently detected. By other alternatives, the exposure time may be set to start and end at the same ns setting as the light pulse to maximize sunlight rejection. By one alternative, the exposures may be set around 375 ns.

The system also may provide tables to select frequencies that correspond to low, medium, or high power, as an example, depending upon the needs of the systems. For example, tables may have different settings for indoor close range, indoor long range, or outdoor maximum performance for example. Application software or middleware might select which power level, or pulse pattern best suits the camera's needs.

While process 500 shows the pulse parameter determination before the exposure time setting as in a system where the light source is the master and the camera is the slave, these operations could be in reverse order where the camera is the master with exposure settings that are then used to determine pulse frequencies to match exposure times from the settings. It will be understood of course that the camera or sensors still may be considered the master with the task of setting the pulses and thereafter setting the exposure times based on the light pulses and then transmitting the pulse parameters to the slave projector.

Completing process 500, process 500 may include "project pattern according to pulse configuration" 510, and as already described above. The projection may provide a rectangle, or other shaped pattern, as in light pattern 200 (FIG. 2) to provide artificial features to objects in a scene being captured and that has little or no features such as a blank white wall to name an example. Note that the projection may be used on scenes that do have features, or may be set to project no matter the contents of a scene.

Process 500 may include "operate shutter according to synchronized exposure time settings" 512, and as already explained with system 400 for example. Thus, the shutter is operated to perform exposure time durations that correspond to the light pulse durations as explained herein.

Then, process 500 may include "detect pattern" 514, and by the sensors as already explained, and then may include "perform depth calculations" 516, and when the process is to perform 3D locating of objects in a scene being viewed or photographed by a camera (or device with one or more cameras) triangulation computations may be performed to determine the distance from the sensor to the projected pattern an object.

While many of the implementation and applications herein is for a stereoscopic 3D camera, the features described herein are not necessarily limited to stereoscopic or even to the 3D camera. Besides stereoscopic, the technique may be applied to structured light, coded light, or any other type of depth camera dependent on detecting a projected light pattern. Besides depth cameras, this method may be useful in any situation where one needs the auxiliary light source to dominate over the ambient light to detect the auxiliary light, such as face and iris detection systems. Thus, any of these or similar systems that project light and have an exposure control may use the benefit of synchronizing the exposure times to the pulses so that a single pulse exposure time corresponds to a single pulse duration for multiple individual pulses during a single frame period and as described in detail herein.

Thus, it also will be appreciated that the method and system of synchronized light pulses and exposure times during a single frame period may be applicable to other sensors and projectors with light other than in the NIR range.

In addition, any one or more of the operations of FIGS. 2-4 and 6-7 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic and/or firmware logic configured to provide the functionality described herein. The software may be embodied as a software package, code and/or instruction set, and/or firmware that stores instructions executed by programmable circuitry. The modules may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

As used in any implementation described herein, the term "engine" and/or "component" may refer to a module or to a logic unit, as these terms are described above. Accordingly, the term "engine" and/or "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 13:
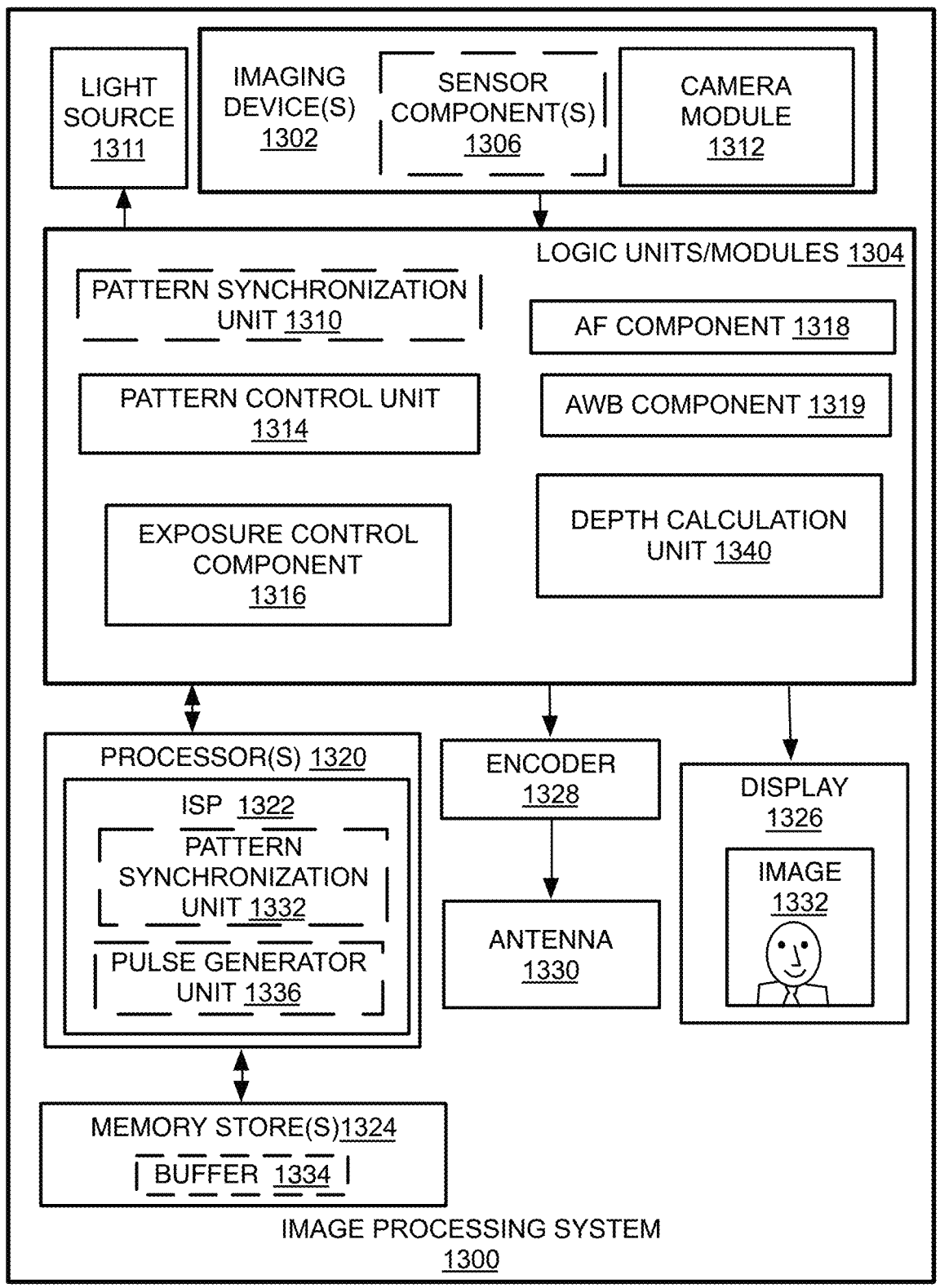
FIG. 13 is an illustrative diagram of an example image processing system according to the implementations herein.

Referring to FIG. 13, an example image processing system 1300 is arranged in accordance with at least some implementations of the present disclosure. In various implementations, the example image processing system 1300 may have an imaging device 1302 to form or receive captured image data as well as to detect light patterns used to provide detectable points to featureless objects. This can be implemented in various ways. Thus, in one form, the image processing system 1300 may be a digital camera or other image capture device, and imaging device 1302, in this case, may be the camera hardware and camera sensor software, module, or component 1312. In other examples, imaging processing system 1300 may have an imaging device 1302 that includes or may be one or more cameras with one or more pattern sensors, and logic modules 1304 may communicate remotely with, or otherwise may be communicatively coupled to, the imaging device 1302 for further processing of the image data.

A light source 1311, such as a pattern projector as described herein, may be in the form of a laser, LED, VCSEL, or other such projector that may project a pattern detectable by the sensors of the imaging devices, and which may project in non-visible light wavelengths such IR or NIR. The projector may be considered part of an imaging device or devices, or may be separate from the devices. Thus, the system 1300 may be a smart phone with two imaging devices (two cameras) and a separate light source 1311 all mounted on the same system (smart phone, tablet, digital camera, or other such device).

By more examples, such technology may include a camera such as a digital camera system, a dedicated camera device, or an imaging phone, whether a still picture or video camera or some combination of both. Thus, in one form, imaging device 1302 may include camera hardware and optics including one or more sensors 1306 as well as auto-focus, zoom, aperture, ND-filter, auto-exposure, flash, and actuator controls. These controls may be part of a sensor module or component 1306 for including and operating sensors, including one or more IR (or other light) or pattern detecting sensor, which may be a CMOS sensor. The sensor component 1306 may be part of the imaging device 1302, or may be part of the logical modules 1304 or both. Such sensor component can be used to control the pattern sensors to detect a projected pattern and provide data indicating the position of the pattern relative to the sensor as well as to generate images for a viewfinder and/or record still pictures or video. The imaging device 1302 also may have a lens, an image sensor with a RGB Bayer color filter, an analog amplifier, an A/D converter, other components to convert incident light (whether visible light or not) into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), with or without the use of a red-green-blue (RGB) depth camera, infra-red (IR) sensor as described herein, and/or microphone-array to locate who is speaking. The IR camera sensor is a global shutter, while other camera sensor(s) may support other types of electronic shutters, such as global shutter or rolling shutter or both, and many other shutter types. In other examples, an RGB-Depth camera may have an IR camera sensor. In some examples, imaging device 1302 may be provided with an eye tracking camera as well.

In the illustrated example, the logic modules 1304 may include the automatic white balancing control 1314, automatic focus (AF) module 1316, and exposure control component 1316 to control sensor exposure. A pattern control unit 1314 may be provided to control the light source 1311. A pattern synchronization unit 1310 or 1332 may communicate with or may include a pulse generator 1336 that may or may not be on-board an ISP 1322, a microcontroller, or other processor 1320. The pulse generator 1336 may be considered part of the pattern control unit, the exposure control component, any combination of these or none of these such that the pulse generator 1336 may be considered to be separate from the camera and light source. The pulse generator 1336 may be connected to a communication link for receiving pulse configuration data, and may be in communication with an interface for such purpose. The logic modules may be communicatively coupled to the imaging device 1302 in order to receive the pattern detection data as well as other raw image data.

The image processing system 1300 may have one or more processors 1320 which may include the dedicated image signal processor (ISP) 1322 such as the Intel Atom, memory stores 1324, one or more displays 1326, encoder 1328, and antenna 1330. In one example implementation, the image processing system 1300 may have the display 1326, at least one processor 1320 communicatively coupled to the display, at least one memory 1324 communicatively coupled to the processor and having a frame buffer 1334. The buffer as well as memory store(s) 1324 may store the frame data from the IR sensor(s) 1306 for use in depth calculations performed by the depth calc. unit 1340 and the processor(s) 1320 or other uses.

The encoder 1328 and antenna 1330 may be provided to compress the modified image date for transmission to other devices that may display or store the image. It will be understood that the image processing system 1300 may also include a decoder (or encoder 1328 may include a decoder) to receive and decode image data for processing by the system 1300. Otherwise, the processed image 1332 may be displayed on display 1326 or stored in memory 1324. As illustrated, any of these components may be capable of communication with one another and/or communication with portions of logic modules 1304 and/or imaging device 1302. Thus, processors 1320 may be communicatively coupled to both the image device 1302 and the logic modules 1304 for operating those components. By one approach, although image processing system 1300, as shown in FIG. 13, may include one particular set of blocks or actions associated with particular components or modules, these blocks or actions may be associated with different components or modules than the particular component or module illustrated here.

Figure 14:
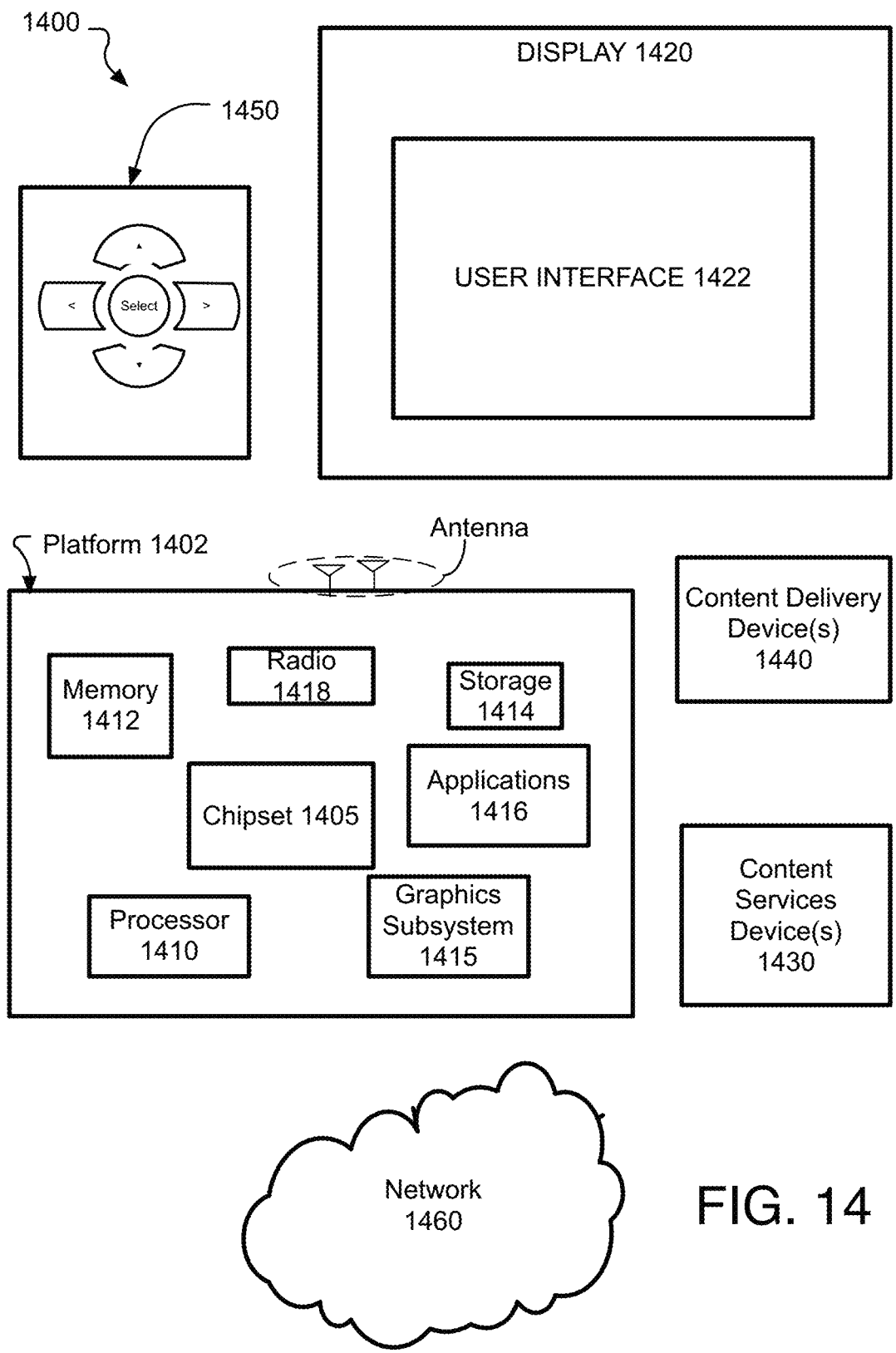
FIG. 14 is an illustrative diagram of an example system.

Referring to FIG. 14, an example system 1400 in accordance with the present disclosure operates one or more aspects of the image processing system described herein. It will be understood from the nature of the system components described below that such components may be associated with, or used to operate, certain part or parts of the image processing system described above. In various implementations, system 1400 may be a media system although system 1400 is not limited to this context. For example, system 1400 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, Display Port, wireless HDMI, and/or wireless HD compliant techniques. Graphics subsystem 1415 may be integrated into processor 1410 or chipset 1405. In some implementations, graphics subsystem 1415 may be a stand-alone card communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of unidirectionally or bidirectionally communicating content between content providers and platform 1402 and/display 1420, via network 1460 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In embodiments, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In implementations, controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various embodiments, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 14.

Referring to FIG. 14, a small form factor device 1400 is one example of the varying physical styles or form factors in which system 1400 may be embodied. By this approach, device 1400 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 15:
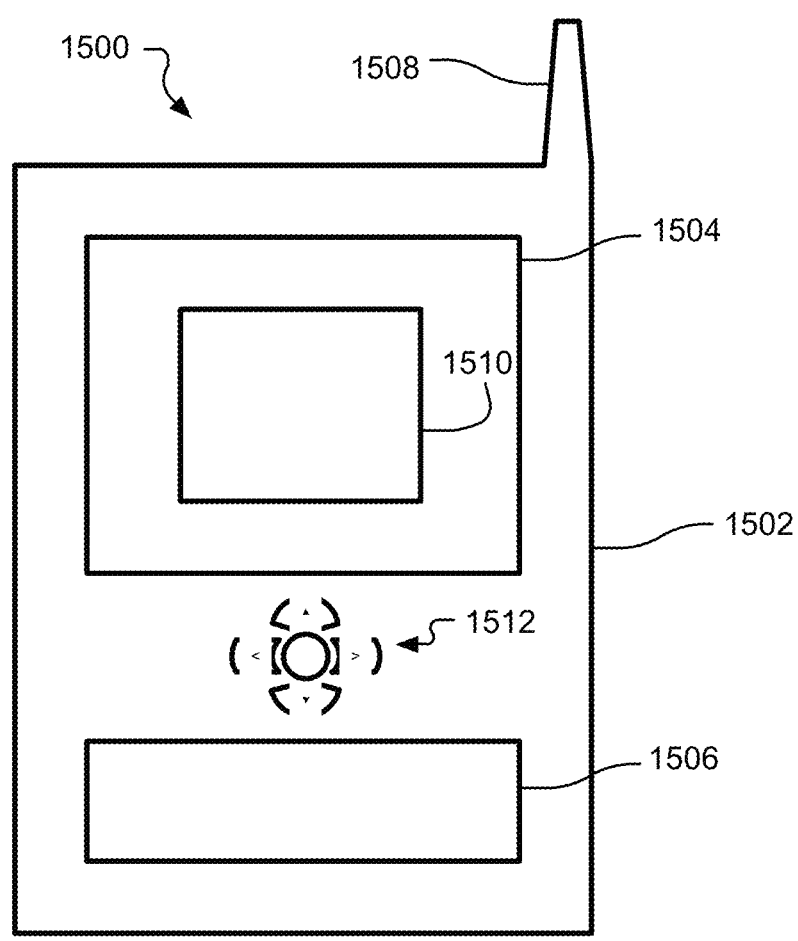
FIG. 15 is an illustrative diagram of an example system, all arranged in accordance with at least some implementations of the present disclosure.

As shown in FIG. 15, device 1500 may include a housing 1502, a display 1504 including a screen 1510, an input/output (I/O) device 1506, and an antenna 1508. Device 1500 also may include navigation features 1512. Display 1504 may include any suitable display unit for displaying information appropriate for a mobile computing device. I/O device 1506 may include any suitable I/O device for entering information into a mobile computing device. Examples for I/O device 1506 may include an alphanumeric keyboard, a numeric keypad, a touch pad, input keys, buttons, switches, rocker switches, microphones, speakers, voice recognition device and software, and so forth. Information also may be entered into device 1500 by way of microphone (not shown). Such information may be digitized by a voice recognition device (not shown). The embodiments are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one implementation, a method of adaptable exposure control and light projection for cameras comprises projecting light in multiple pulses in a single frame period, wherein the frame period is used to capture a single image of a scene; performing multiple exposure times during the single frame period and at at least one sensor used to detect the scene; and synchronizing the exposure times to the pulses so that a single exposure time corresponds to a single pulse duration for multiple individual pulses during the single frame period.

By a further implementation, the method also may comprise projecting an infra-red light; and emitting and sensing light at about 940 nm or about 939 nm to about 941 nm; wherein at least one of: (1) the pulses are provided at a substantially uniform frequency throughout the frame period, and (2) the pulses are concentrated so that at least one non-pulsed duration exists during the frame period and that has a duration longer than a duration between adjacent pulses used multiple times during the frame period, wherein the non-pulsed duration in a frame period is longer than the total duration of the pulses in the frame period, wherein the pulses are bunched together in a single area of the frame period. Also, the method may include wherein the pulses are provided so that the pulses of a frame period has an average power of the frame period that is below a threshold average power, but a peak power of the pulses is above the threshold average power, wherein the threshold is associated with a laser eye safety threshold; wherein all exposure times in a frame period are synchronized to a pulse during the frame period; and the method comprising receiving a signal from the sensors associated with the detection of the projected light, and using the signal to perform depth measurement calculations, wherein the light is projected as a geometrical pattern.

By yet a further implementation, a system may comprise comprising: at least one projector to project a light pattern to provide features for a scene; at least one sensor to detect the pattern; at least one memory; at least one processor communicatively and operatively coupled to the projector, sensor, and memory; a light unit operated by the at least one processor and arranged to control the projector to project light in multiple pulses in a single frame period, wherein the frame period is used to capture a single image of a scene; an exposure unit operated by the at least one processor and arranged to control the at least one sensor to perform multiple exposure times during the single frame period and at at least one sensor used to detect the scene; and a synchronization unit operated by the at least one processor and arranged to synchronize the exposure times to the pulses so that a single exposure time corresponds to a single pulse duration for multiple individual pulses during the single frame period.

By another implementation, the system may comprise wherein the light unit is to project an infra-red light; and emit and sense light at about 940 nm or about 939 nm to about 941 nm; wherein at least one of: (1) the pulses are provided at a substantially uniform frequency throughout the frame period, and (2) the pulses are concentrated so that at least one non-pulsed duration exists during the frame period and that has a duration longer than a duration between adjacent pulses used multiple times during the frame period, wherein the non-pulsed duration in a frame period is longer than the total duration of the pulses in the frame period, wherein the pulses are bunched together in a single area of the frame period. Also, the system includes wherein the pulses are provided so that the pulses of a frame period has an average power of the frame period that is below a threshold average power, but a peak power of the pulses is above the threshold average power, wherein the threshold is associated with a laser eye safety threshold; wherein all exposure times in a frame period are synchronized to a pulse during the frame period; and the system being arranged to receive a signal from the sensors associated with the detection of the projected light, and use the signal to perform depth measurement calculations, wherein the light is projected as a geometrical pattern.

By yet another implementation, a computer readable medium having stored thereon instructions that when executed cause a computing device to: project light in multiple pulses in a single frame period, wherein the frame period is used to capture a single image of a scene; perform multiple exposure times during the single frame period and at at least one sensor used to detect the scene; and synchronize the exposure times to the pulses so that a single exposure time corresponds to a single pulse duration for multiple individual pulses during the single frame period.

By an additional implementation, the computer readable medium wherein the instructions cause the computing device to: project an infra-red light; and emit and sense light at about 940 nm or about 939 nm to about 941 nm; wherein at least one of: (1) the pulses are provided at a substantially uniform frequency throughout the frame period, and (2) the pulses are concentrated so that at least one non-pulsed duration exists during the frame period and that has a duration longer than a duration between adjacent pulses used multiple times during the frame period, wherein the non-pulsed duration in a frame period is longer than the total duration of the pulses in the frame period, wherein the pulses are bunched together in a single area of the frame period. The instructions cause the computing device to include wherein the pulses are provided so that the pulses of a frame period has an average power of the frame period that is below a threshold average power, but a peak power of the pulses is above the threshold average power, wherein the threshold is associated with a laser eye safety threshold; wherein all exposure times in a frame period are synchronized to a pulse during the frame period; and wherein the instructions cause the computing device to receive a signal from the sensors associated with the detection of the projected light, and use the signal to perform depth measurement calculations, wherein the light is projected as a geometrical pattern.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A method of adaptable exposure control and light projection for cameras, comprising:
   obtaining parameters of multiple pulses including pulse width and frequency having a total duration that is a percentage of a single frame duration set, at least in part, to have an average power of the frame to be below an eye safety threshold;
   projecting light in the multiple pulses from a single light source in order to form an image of a scene and in a single frame period, wherein the frame period is used to capture a single image of the scene;
   performing multiple exposure times during the single frame period and by at least one sensor used to detect the scene; and
   synchronizing the exposure times to the pulses so that a single exposure time corresponds to a single pulse duration for multiple individual pulses during the single frame period;
   wherein the pulses are concentrated so that at least one non-pulsed duration exists during the frame period and that has a duration longer than a duration between adjacent pulses used multiple times during the frame period.

2. The method of claim 1 comprising projecting an infra-red light.

3. The method of claim 1 comprising emitting and sensing light at about 940 nm or about 939 nm to about 941 nm.

4. The method of claim 1 wherein the non-pulsed duration in a frame period is longer than the total duration of the pulses in the frame period.

5. The method of claim 1 wherein the pulses are bunched together in a single area of the frame period.

6. The method of claim 1 wherein all exposure times in a frame period are synchronized to a pulse during the frame period.

7. The method of claim 1 comprising receiving a signal from the sensors associated with the detection of the projected light, and using the signal to perform depth measurement calculations.

8. The method of claim 1 wherein the light is projected as a geometrical pattern.

9. The method of claim 1 comprising projecting an infra-red light; and emitting and sensing light at about 940 nm or about 939 nm to about 941 nm;
   wherein the non-pulsed duration in a frame period is longer than the total duration of the pulses in the frame period, wherein the pulses are bunched together in a single area of the frame period;
   wherein the pulses are provided so that the pulses of a frame period have an average power of the frame period that is below a threshold average power, but a peak power of the pulses is above the threshold average power, wherein the threshold is associated with a laser eye safety threshold;
   wherein all exposure times in a frame period are synchronized to a pulse during the frame period; and
   the method comprising receiving a signal from the sensors associated with the detection of the projected light, and using the signal to perform depth measurement calculations, wherein the light is projected as a geometrical pattern.

10. A system comprising:
    at least one projector to project a light pattern to provide features for a scene;
    at least one sensor to detect the pattern;
    at least one memory;
    at least one processor communicatively and operatively coupled to the projector, sensor, and memory;
    a light unit operated by the at least one processor and arranged to:
      obtain parameters of multiple pulses including pulse width and frequency having a total duration that is a predetermined percentage of a single frame duration set, at least in part, to have an average power of the frame to be below an eye safety threshold, and
      control the projector to project light in the multiple pulses from a single light source in order to form an image of a scene and in a single frame period, wherein the frame period is used to capture a single image of a scene;
    an exposure unit operated by the at least one processor and arranged to control the at least one sensor to perform multiple exposure times during the single frame period and by at least one sensor used to detect the scene; and
    a synchronization unit operated by the at least one processor and arranged to synchronize the exposure times to the pulses so that a single exposure time corresponds to a single pulse duration for multiple individual pulses during the single frame period.

11. The system of claim 10 wherein the light is of a projection of infra-red light.

12. The system of claim 10 wherein the light is emitted at about 940 nm or about 939 nm to about 941 nm.

13. The system of claim 10 wherein the pulses are provided at a substantially uniform frequency throughout the frame period.

14. The system of claim 10 wherein the pulses are concentrated so that at least one non-pulsed duration exists during the frame period and that has a duration longer than a duration between adjacent pulses used multiple times during the frame period.

15. The system of claim 14 wherein the non-pulsed duration in a frame period is longer than the total duration of the pulses in the frame period.

16. The system of claim 14 wherein the pulses are bunched together in a single area of the frame period.

17. The system of claim 10 wherein the light unit is to project an infra-red light; and emit and sense light at about 940 nm or about 939 nm to about 941 nm;

wherein at least one of:
the pulses are provided at a substantially uniform frequency throughout the frame period, and
the pulses are concentrated so that at least one non-pulsed duration exists during the frame period and that has a duration longer than a duration between adjacent pulses used multiple times during the frame period, wherein the non-pulsed duration in a frame period is longer than the total duration of the pulses in the frame period, wherein the pulses are bunched together in a single area of the frame period;

wherein all exposure times in a frame period are synchronized to a pulse during the frame period; and the system being arranged to receive a signal from the sensors associated with the detection of the projected light, and use the signal to perform depth measurement calculations, wherein the light is projected as a geometrical pattern.

18. A non-transitory computer-readable medium having stored thereon instructions that when executed cause a computing device to:

obtain parameters of multiple pulses including pulse width and frequency having a total duration that is a percentage of a single frame duration set, at least in part, to have an average power of the frame to be below an eye safety threshold;

project light in the multiple pulses from a single light source in order to form an image of a scene and in a single frame period, wherein the frame period is used to capture a single image of a scene;

perform multiple exposure times during the single frame period and by at least one sensor used to detect the scene; and synchronize the exposure times to the pulses so that a single exposure time corresponds to a single pulse duration for multiple individual pulses during the single frame period;

wherein the pulses are concentrated so that at least one non-pulsed duration exists during the frame period and that has a duration longer than a duration between adjacent pulses used multiple times during the frame period.

19. The computer-readable medium of claim 18 wherein the instructions cause the computing device to: project an infra-red light; and emit and sense light at about 940 nm or about 939 nm to about 941 nm;

wherein all exposure times in a frame period are synchronized to a pulse during the frame period; and wherein the instructions cause the computing device to receive a signal from the sensors associated with the detection of the projected light, and use the signal to perform depth measurement calculations, wherein the light is projected as a geometrical pattern.

20. The computer-readable medium of claim 18 wherein the non-pulsed duration in a frame period is longer than the total duration of the pulses in the frame period.

21. The computer-readable medium of claim 18 wherein the pulses are bunched together in a single area of the frame period.

* * * * *